United States Patent  (10) Patent No.: US 7,739,743 B2
Itoi et al.  (45) Date of Patent: Jun. 15, 2010

(54) INFORMATION PRESENTATION APPARATUS, AND INFORMATION PRESENTATION METHOD AND PROGRAM FOR USE THEREIN

(75) Inventors: Masaharu Itoi, Inzai (JP); Hiroshi Maruyama, Tokyo (JP); Hiroshi Nomiyama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 11/364,445

(22) Filed: Feb. 28, 2006

(65) Prior Publication Data

US 2006/0215298 A1  Sep. 28, 2006

(30) Foreign Application Priority Data

Mar. 25, 2005 (JP) ............................. 2005-089579

(51) Int. Cl.
*G06F 12/14* (2006.01)
*G06F 17/30* (2006.01)

(52) U.S. Cl. .............................. 726/26; 726/32; 707/3; 707/6

(58) Field of Classification Search ........................ None
See application file for complete search history.

(56) References Cited

U.S. PATENT DOCUMENTS

| | | | |
|---|---|---|---|
| 6,282,698 B1 * | 8/2001 | Baker et al. | 717/118 |
| 7,370,205 B2 * | 5/2008 | Ogino | 713/176 |
| 7,472,114 B1 * | 12/2008 | Rowney et al. | 707/3 |
| 2003/0093518 A1 * | 5/2003 | Hiraga | 709/224 |
| 2004/0078334 A1 * | 4/2004 | Malcolm et al. | 705/50 |
| 2004/0199596 A1 * | 10/2004 | Nutkis | 709/207 |

(Continued)

FOREIGN PATENT DOCUMENTS

JP  2001-076000  3/2001

(Continued)

OTHER PUBLICATIONS

Stéphane Ducasse, Matthias Rieger, Serge Demeyer, "A language independent approach for detecting duplicated code", Proceedings ICSM'99 (International Conference on Software Maintenance, 1999, available at http://plg.uwaterloo.ca/~migod/746/papers/bern-cloning.pdf.*

(Continued)

*Primary Examiner*—William R Korzuch
*Assistant Examiner*—Michael R Vaughan
(74) *Attorney, Agent, or Firm*—Ronald Kaschak; Shimokaji & Associates, P.C.

(57) ABSTRACT

Provision of a technology capable of presenting information regarding derivative files secondarily derived and created from a leaked file, by retrieving the first leaked file, and capable of presenting personal information recorded on a computer accessible via a wide area network. There is provided an apparatus including a recording section for recording original data of a leaked file, an extracting section for extracting the original data and representations corresponding to information that should be prevented from being leaked and included in one or more files existing in a recording area to be investigated, an investigating section for investigating a degree of association between the file existing in the recording area to be investigated and the original data based on the extracted representations, and a presenting section for presenting information on a file created based on the leak.

1 Claim, 8 Drawing Sheets

U.S. PATENT DOCUMENTS

| | | | |
|---|---|---|---|
| 2005/0114840 A1* | 5/2005 | Zeidman | 717/126 |
| 2005/0154601 A1* | 7/2005 | Halpern et al. | 705/1 |
| 2005/0240617 A1* | 10/2005 | Lund et al. | 707/102 |
| 2006/0005177 A1* | 1/2006 | Atkin et al. | 717/151 |
| 2006/0005247 A1* | 1/2006 | Zhang et al. | 726/26 |
| 2006/0129523 A1* | 6/2006 | Roman et al. | 707/1 |

FOREIGN PATENT DOCUMENTS

| | | |
|---|---|---|
| JP | 2003-076662 | 3/2003 |
| JP | 2003036208 A | 7/2003 |
| JP | 2004-118243 | 4/2004 |
| JP | 2006-065837 | 3/2006 |
| JP | 2006-185153 | 7/2006 |

OTHER PUBLICATIONS

Kristina L. Verco and Michael J. Wise, Software for Detecting Suspected Plagiarism: Comparing Structure and Attribute-Counting Systems, Jul. 3-5, 1996, ACM, Presented at the First Australian Conference on Computer Science Education, Sydney, Australia, John Rosenberg (Ed).*

IPDL.INPIT, [online]; [retrieved on Dec. 19, 2007]; retrieved from the Internet http://www19.ipdl.inpit.go.jp/PA1/result/detail/main/wAAAIZaGXyDA415036208P... O. Takashi, "Information Leakage Detecting and Preventing Device and its Method" Patent Absract JP2003-036208 A, Jul. 2, 2003, 1p.

Tadashiro Yoshida, et al., "Applying Content-based Image Retrieval Method to Detecting Illegally Used Image", Journal of Information Processing Society of Japan vol. 42 No. SIG1 (TOD8) IPSJ, Japan, Information Processing Society of Japan, Feb. 6, 2001, vol. 42, p. 171-181.

Itaru Hosomi et al., "An Information Leakage Risk Evaluation Method Based on Document Content Analysis and Configuration Validation (2): Classification of Confidential Information Employing Document Contents and Structure Analysis", collected papers of speeches for The $67^{th}$ (2005) National Conference (3), Database and Media Network, Japan Information Processing Society of Japan, Mar. 2, 2005, p. 35, 36.

Haruhito Tsuchiya, "Searching for Buried Personal Data: Personal Information Search/The Monitoring Tool 'P Pointer'", Computopia, Japan, Computer Age, Co., Ltd., Mar. 1, 2005, vol. 39, No. 462, p. 26, 27.

Akira Maegawa et al. "A Proposal for a Web Searching Method for Detection of Web Pages Infringing on Copyrights by Means of Web Page Similarities", collected papers of Information Processing Society of Japan for the $64^{th}$ National Speech, Japan, Information Processing Society of Japan, Mar. 12, 2002, V3 N5Y-04, p. 3-135-p. 3-136.

* cited by examiner

| NAME OF FILE | PERSONAL INFORMATION | PERSONAL INFORMATION (NUMBER OF ELEMENTS) | PERSON'S NAME | PERSON'S NAME (DIFF) | ADDRESS | ADDRESS (DIFF) | NUMBER OF WORDS | NUMBER OF SENTENCES | RATIO (PERSON'S NAME (DIFF)/ NUMBER OF WORDS) (%) | RATIO (PERSONAL INFORMATION/ NUMBER OF WORDS) (%) | RATIO (PERSONAL INFORMATION [NUMBER OF ELEMENTS]/ NUMBER OF WORDS) (%) | NUMBER OF COINCIDENCES | RATIO OF COINCIDENCE |
|---|---|---|---|---|---|---|---|---|---|---|---|---|---|
| C:¥My Documents ..¥address.doc | 53 | 248 | 78 | 74 | 5 | 4 | 852 | 223 | 8.69% | 6.22% | 29.11% | 28 [100%] | 26.25 |
| C:¥My Documents ..¥manager_address.txt | 6 | 24 | 7 | 1 | 0 | 0 | 230 | 121 | 0.43% | 2.61% | 10.43% | 13 [21.429%] | 13.21 |
| C:¥My Documents ..¥income.xls | 6 | 24 | 7 | 1 | 0 | 0 | 2432 | 121 | 0.04% | 0.25% | 0.99% | 6 [21.429%] | 6 |
| C:¥My Documents ..¥personal.pdf | 1 | 4 | 7 | 2 | 1 | 1 | 2596 | 156 | 0.08% | 0.04% | 0.15% | 1 [3.571%] | 1 |

FIG. 4

| NAME OF FILE | PERSONAL INFORMATION | PERSONAL INFORMATION (NUMBER OF ELEMENTS) | PERSON'S NAME | PERSON'S NAME (DIFF) | ADDRESS | ADDRESS (DIFF) | NUMBER OF WORDS | NUMBER OF SENTENCES | RATIO (PERSON'S NAME (DIFF)/ NUMBER OF WORDS) (%) | RATIO (PERSONAL INFORMATION/ NUMBER OF WORDS) (%) | RATIO (PERSONAL INFORMATION [NUMBER OF ELEMENTS]/ NUMBER OF WORDS) (%) | NUMBER OF COINCIDENCES |
|---|---|---|---|---|---|---|---|---|---|---|---|---|
| http://www.aaa.xxx/1/2/abc/data.html | 4 | 16 | 6 | 2 | 12 | 3 | 5062 | 256 | 0.04% | 0.08% | 0.32% | 4 |
| http://www.gro.xx/aa/bb/DATA.html | 3 | 14 | 11 | 4 | 9 | 2 | 3926 | 91 | 0.10% | 0.08% | 0.36% | 1 |
| http://www.bb.xx/qq/ss/data05.pdf | 33 | 138 | 41 | 14 | 8 | 3 | 12456 | 914 | 0.11% | 0.27% | 1.11% | 1 |

FIG. 7

INFORMATION PRESENTATION APPARATUS, AND INFORMATION PRESENTATION METHOD AND PROGRAM FOR USE THEREIN

FIELD OF THE INVENTION

The present invention relates to an information presentation apparatus, an information presentation method, and a program product, and particularly relates to an information presentation apparatus for presenting information in association with information that should be prevented from being leaked, and an information presentation method and a program product for use therein.

BACKGROUND OF THE INVENTION

In recent years, there has been a problem of how to prevent a third party from leaking, stealing, and improperly using given information. Moreover, if leakage of any given information occurs from an information processing system, it is desirable that an administrator of that system can surely track and obtain the cause of the leakage of the given information.

Therefore, there is a known method of tracing and obtaining the cause of the leakage by leaving histories in which an access has been made to the information that should be prevented from being leaked and referencing the histories in which the access has been made after the leakage (for example, refer to Japanese Unexamined Patent Publication (Kokai) No. 2004-118243, and Japanese Unexamined Patent Publication (Kokai) No. 2003-076662). According to this method, the cause of the leakage can be identified by user names in the access histories by referencing the access histories after the information has been leaked out once.

SUMMARY OF THE INVENTION

In the method of Kokai 2004-118243 and 2003-076662, however, the administrator of the information processing system goes no further than making an investigation into the cause of the information leakage and is unable to grasp information derived from the leaked information. Specifically, once information is leaked, a new file might be created based on the leaked information and further information will be leaked from the new file. Therefore, it is desirable for the administrator to grasp whether there is secondary or tertiary leaked information and locations of record of the secondary or tertiary leaked information or file names thereof on the basis of the leaked information.

Moreover, in the method of Kokai 2004-118243 and 2003-076662, the administrator cannot grasp information that is recorded in a computer accessible through a communication network and that should be prevented from being subjected to leakage.

It is an object of the present invention to provide an information presenting apparatus capable of presenting an administrator with information on derivative files by searching for the files secondarily or tertiarily derived and created from a leaked file and capable of presenting the administrator with information that is related to information recorded in a computer accessible through a communication network and that should be prevented from being subjected to leakage, and an information presenting method and a program product for use therein.

In accordance with a first aspect of the present invention, there is provided an apparatus including a recording section for recording original data of a leaked file, an extracting section for extracting the original data and representations corresponding to information to be prevented from being subjected to leakage and included in one or more files existing in a recording area to be investigated, an investigating section for investigating a degree of association between the file existing in the recording area to be investigated and the original data based on the extracted representations, and a presenting section for presenting information on a file created based on the leaked file on the basis of the degree of association, and a method and a program for use therein.

In accordance with the present invention, it is possible to provide an information presentation apparatus for presenting information in association with information that should be prevented from being leaked, an information presentation method, and a program for use therein.

BRIEF DESCRIPTION OF THE DRAWINGS

FIG. 4 is a table showing an example of information on a secondary file.

FIG. 7 is a table showing an example of the information on the secondary file.

DETAILED DESCRIPTION OF THE DRAWINGS

Hereinafter, preferred embodiments of the present invention will be described with reference to the drawings.

Figure 1:
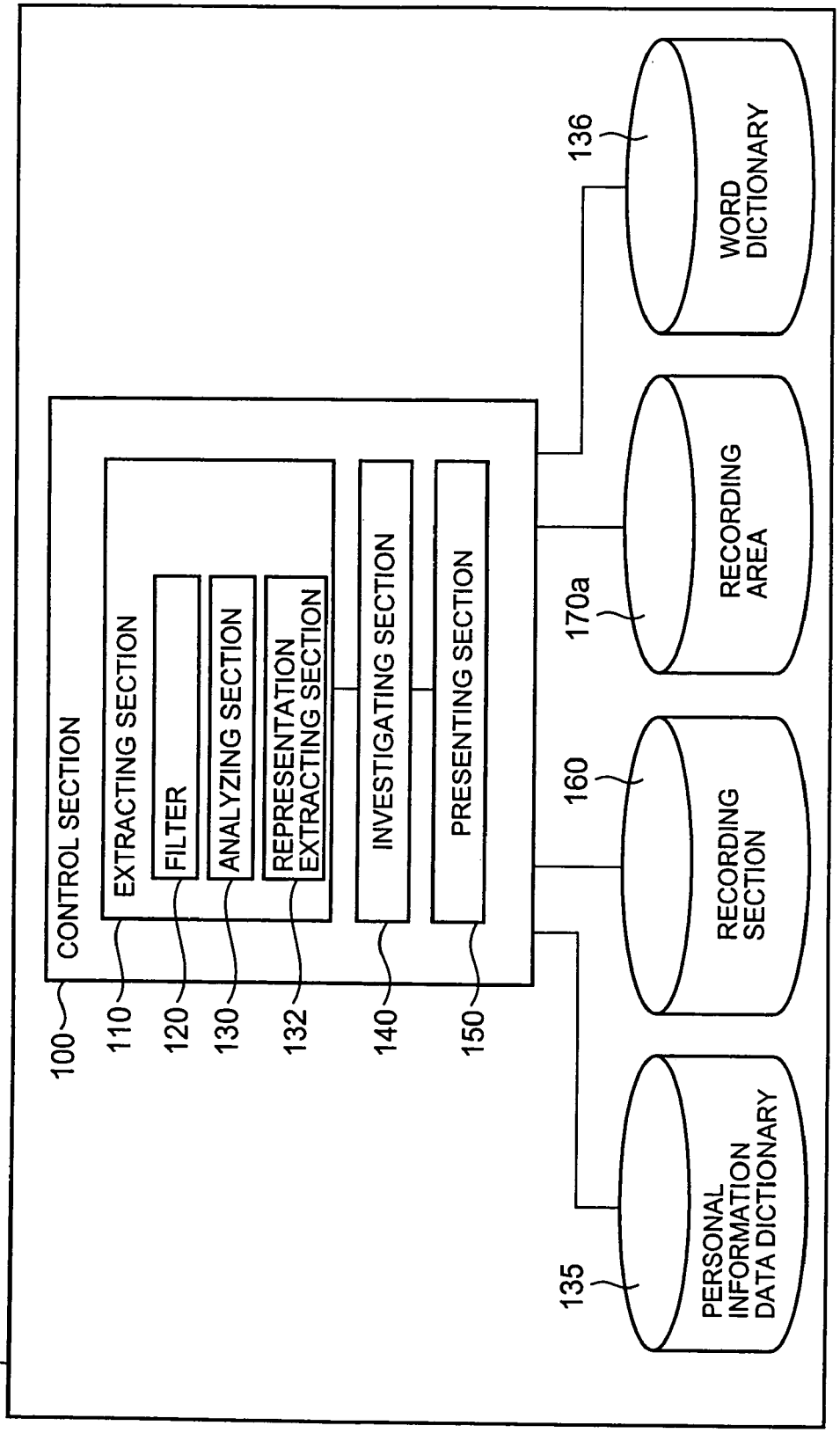
FIG. 1 is a functional block diagram of a leaked information presenting apparatus 10.

FIG. 1 is a block diagram showing a configuration of a leaked information presenting apparatus 10. The leaked information presenting apparatus 10 is an information presentation apparatus for presenting information in association with information to be prevented from being subjected to leakage. For example, the leaked information presenting apparatus 10 is an apparatus for presenting a user with information on a file created based on original data of the file that has already leaked. The leaked information presenting apparatus 10 may be a general computer, a Personal Digital Assistant, a mobile phone or the like. The leaked information presenting apparatus 10 includes a control section 100, a recording section 160, a recording area 170a, a personal information data dictionary 135, and a word dictionary 136.

The control section 100 controls information of the leaked information presenting apparatus 10. The control section 100 may be a Central Processing Unit. The control section 100 includes an extracting section for extracting representations corresponding to information that should be prevented from being subjected to leakage, an investigating section for investigating a degree of association between one or more files existing in a recording area to be investigated and the original data based on an extracted representations, and a presenting section for presenting information on a file created based on the original data on the basis of the degree of association. It is to be noted that the information that should be prevented from being subjected to leakage may be information that the user hopes not to be flown outside (outside of a company, home, or the like), and information that the user desires to prevent from being leaked. The information that should be prevented from being subjected to leakage may be personal information.

The extracting section 110 extracts the representations corresponding to the information that should be prevented from being subjected to leakage. Specifically, the extracting section 110 includes a filter 120 for converting data complying with a specific application program format to text format data, an analysis section 130 for executing a morphological analysis to the converted text format data, and a representation extracting section 132 for extracting representations corresponding to the information that should be prevented from being subjected to leakage, based on a result of executing the morphological analysis.

The filter 120 converts the file data complying with the specific application program format to the text format data. Specifically, the filter 120 converts data of a file with a format used for application software such as an edit program, a spreadsheet program, or the like, and a file with an HTML format, to data of a file with a format (text format) which does not include any specific format. The text format file herein is a file composed of characters read and written by a human being. Moreover, the filter 120 may be a text converter which operates as a program for extracting only the text in the file.

The analysis section 130 executes the morphological analysis to the data extracted by the filter 120. Note: the morphological analysis herein is dividing a sentence into morphemes and assigning the divided morphemes to respective parts of speech. The analysis section 130 decomposes the text format file into words or respective character strings with reference to the word dictionary 136 (electronic dictionary on which meanings, parts of speech of words or the like are recorded as data) to provide them with a word class, respectively. Note: the word class herein includes not only information on the parts of speech, but also information on the word category or group among the parts of speech. For example, when a text sentence "Tanaka Ichiro, IBM Japan, Roppongi, Minato-ku, Tokyo x-x-x, tanaka@ibm.xxx" is supplied, the morphological analysis will be executed as shown in Table 1.

TABLE 1

| Text sentence | Analysis result |
| --- | --- |
| Tanaka | Proper noun: Family name |
| Ichiro | Proper noun: Given name |
| , | Comma |
| Nihon I.B.M. | Proper noun: Company name |
| , | Comma |
| Tokyo | Place name |
| Minato-ku | Place name |
| Roppongi | Place name |
| x-x-x | Number |
| , | Comma |
| tanaka@ibm.xxx | e-mail address |

The representation extracting section 132 extracts named entities out of the file of text format file using a result that the analysis section 130 has analyzed. The named entities herein are representations with a high possibility of information that should be prevented from being subjected to leakage. The named entities herein are information related to a family name, a given name (a person's name, a corporation name, and a company name are included), a zip code, an address, a telephone number, an organization to which he or she belongs, an e-mail address, a Website address, and a data of birth. A primary account number of a card, an account number, or the like may be included as other named entities. When at least any one of these named entities are detected from the result of the analysis section 130, the representation extracting section 132 extracts a detected word and a character string as the named entity.

An example for the representation extracting section 132 to extract a zip code as the named entity will be described below. The representation extracting section 132 detects seven-digit numbers from the text format file, or numerical characters which are present as the zip code among numerical characters with a form of "XXX-XXXX" (X is a numerical character) from a zip code dictionary, and then if a digit sequence that meets a condition is detected, the representation extracting section 132 extracts the digit sequence as the inherent information on the zip code.

Another example for the representation extracting section 132 to extract a telephone number as the named entity will be described below. From the file of the text format data, the representation extracting section 132 extracts such a sequence of digits that have four-digit numbers, and have an area code before a hyphen (-) or a single-byte blank after determining whether there is the hyphen (-) or the single-byte blank before the four-digit numbers, as the inherent information on the telephone number.

An example for the representation extracting section 132 to extract an e-mail address as the named entity will now be described. From the text format file, the representation extracting section 132 determines whether there are alphanumeric character strings before "@" and there are alphanumeric character strings including "." after "@" to thereby extract the character strings as the inherent information on the e-mail address.

Even when the primary account number, the account number, or the like of the other card is extracted as the named entity, the representation extracting section 132 can extract any of them as the named entity corresponding to a format peculiar to respective alphanumeric characters and symbols.

The representation extracting section 132 generates named entity data from the extracted named entity. At the step of extracting one named entity, the representation extracting section 132 supplies the named entity to a corresponding value in a frame shown in Table 2. The representation extracting section 132 also supplies a subsequently extracted named entity to a corresponding value in the frame shown in Table 2.

TABLE 2

| Slot | Family name | Given name | Zip code | Address | Telephone number | Organization | e-mail address |
| --- | --- | --- | --- | --- | --- | --- | --- |
| Value | Tanaka | Ichiro | | | | | |

Here, after the representation extracting section 132 generates one frame, the representation extracting section 132 may process the frame to empty the value of the frame, to thereby supply a slot with a subsequent value. For example, when the representation extracting section 132 extracts both of (a family name and a given name) as a person's name and the representation extracting section 132 generates a frame, the representation extracting section 132 determines the frame to be personal information and records values indicating the (family name, given name) on the recording section 160. Then, such an embodiment may be employed that the representation extracting section 132 supplies the frame being empty with an input of the value indicating the next named entity.

Alternatively, as another embodiment, when the necessity of supplying an identical slot in a frame with an input of any value arises, the representation extracting section 132 may generate the next frame. After extracting both of the (family name, given name) as the person's name, when the representation extracting section 132 further extracts another person's name (a family name, a given name), the representation extracting section 132 may generate the next frame to supply the another person's name (family name, given name) to the slot as the values.

In order to determine whether the representation extracting section 132 supplies one slot with an input of a value, or generates a new slot to be supplied with an input of the value, a condition, such as a lifetime of the value or the like may be provided for every slot. For example, when a "given name" is supplied to a slot in terms of a value after a "family name" is supplied thereto in terms of a value, it is typical that at most three words or less of the given name will occur after the supply of the "family name". Moreover, there may be determined such a condition that a telephone number occurs within ten words or less from an occurrence of the family name. Accordingly, when the value exceeds a predetermined number of words, the lifetime of the value may be set so as to clear all of the values in the frame.

Similarly with other slots, if inputs of the address and telephone number are supplied to the slots within approximately three words or less after an input of the zip code to the slots, such other slots may be set so that the representation extracting section 132 supplies identical frames with the inputs.

Prior to extracting the named entity, the representation extracting section 132 may normalize character strings or words analyzed by the analysis section 130. Note: the normalization herein is to be understood as performing a process based on a predetermined rule, for example, deleting any additional blanks and noises of the detected words and character strings. With reference to the personal information data dictionary 135 (electronic dictionaries, such as an address dictionary, an e-mail address dictionary, and an area code dictionary), the representation extracting section 132 may analyze a semantic element to the character strings or words analyzed by the analysis section 130. For example, whether an area name derived from continuous area names as shown in Table 1 is an area name which actually exists may be analyzed using the address dictionary on which addresses are registered, or whether continuous alphanumeric characters or symbols of the e-mail address actually exist may be analyzed.

The representation extracting section 132 further extracts the "information that should be prevented from being leaked" from the frame on which the generated named entity is described. A judgment criterion for the representation extracting section 132 to determine the "information that should be prevented from being leaked" may be arbitrarily determined by the user utilizing the system, and may also be adjustable. For example, on condition that the values are supplied to both of the slots "family name" and "given name" in one frame, the representation extracting section 132 may determine the frame as the "information that should be prevented from being leaked". Alternatively, in addition to that the values are supplied to both of the slot "family name" and "given name" in one frame, on condition that the value is given to any one of contact destinations, such as the zip code, the address, the telephone number, the e-mail address, or the like, the representation extracting section 132 may determine this frame to be the "information that should be prevented from being leaked".

At the time of supplying the corresponding slot with an input of the named entity in terms of a value, even when the representation extracting section 132 would not supply the value to the strictly correct slot, if a plurality of named entities are closely extracted, the named entities may be determined by the representation extracting section 132 to be the "information that should be prevented from being leaked".

The representation extracting section 132 extracts a value from the frame determined that the "information that should be prevented from being leaked" may be described therein, and records it on the recording section 160 as personal information data.

The investigating section 140 investigates a degree of association between one or more respective files existing in a recording area to be investigated and the original data based on the personal information data extracted by the representation extracting section 132. The degree of association herein is a degree of association between the "information that should be prevented from being leaked" described in the original data and the "information that should be prevented from being leaked" described in the file existing in the recording area to be investigated (namely, a file suspected of being a secondary file). For example, the degree of association may be a degree of coincidence. The degree of coincidence may be a degree of how many times the same "information should be prevented from being leaked" exists.

The presenting section 150 presents information with regard to a file which has been created based on the leaked file, on the basis of the degree of association that the investigating section 140 investigated. In other words, the presenting section 150 presents the information regarding the file which has been created secondarily, tertiarily, or after that, based on the detected "information that should be prevented from being leaked".

The recording section 160 records the original data. In other words, the recording sections 160 may be a hard disk or a semiconductor memory, and may be an external recording device (flexible disk, CD, DVD, tape, or the like). In addition, the recording section 160 may record data (frame and personal information data) dealt with by the leaked information presenting apparatus 10.

The recording area 170a is a recording area on which a secondary file and a tertiary file created from the original data may possibly be recorded. In other words, the recording area 170a is an area where the user considers that the file having been created based on the original data will be recorded. Hence, a file, data, and a sentence including the "information that should be prevented from being leaked", and a file, data, and a sentence not including the "information that should be prevented from being leaked" may be both recorded on the recording area 170a. When the user assumes that the "information that should be prevented from being leaked" is included in a tape for backup, a file in a shared folder, a log file of a server, or the like, a storage location in the tape and the folder may be the recording area 170a. A hard disk, a semiconductor memory, or the like may be used as the recording area 170a. Moreover, it may be a recording unit connected to the outside of the leaked information presenting apparatus 10 like a recording area 170b (refer to FIG. 5), or may be a recording unit in other computers connected through the communication network.

Figure 2:
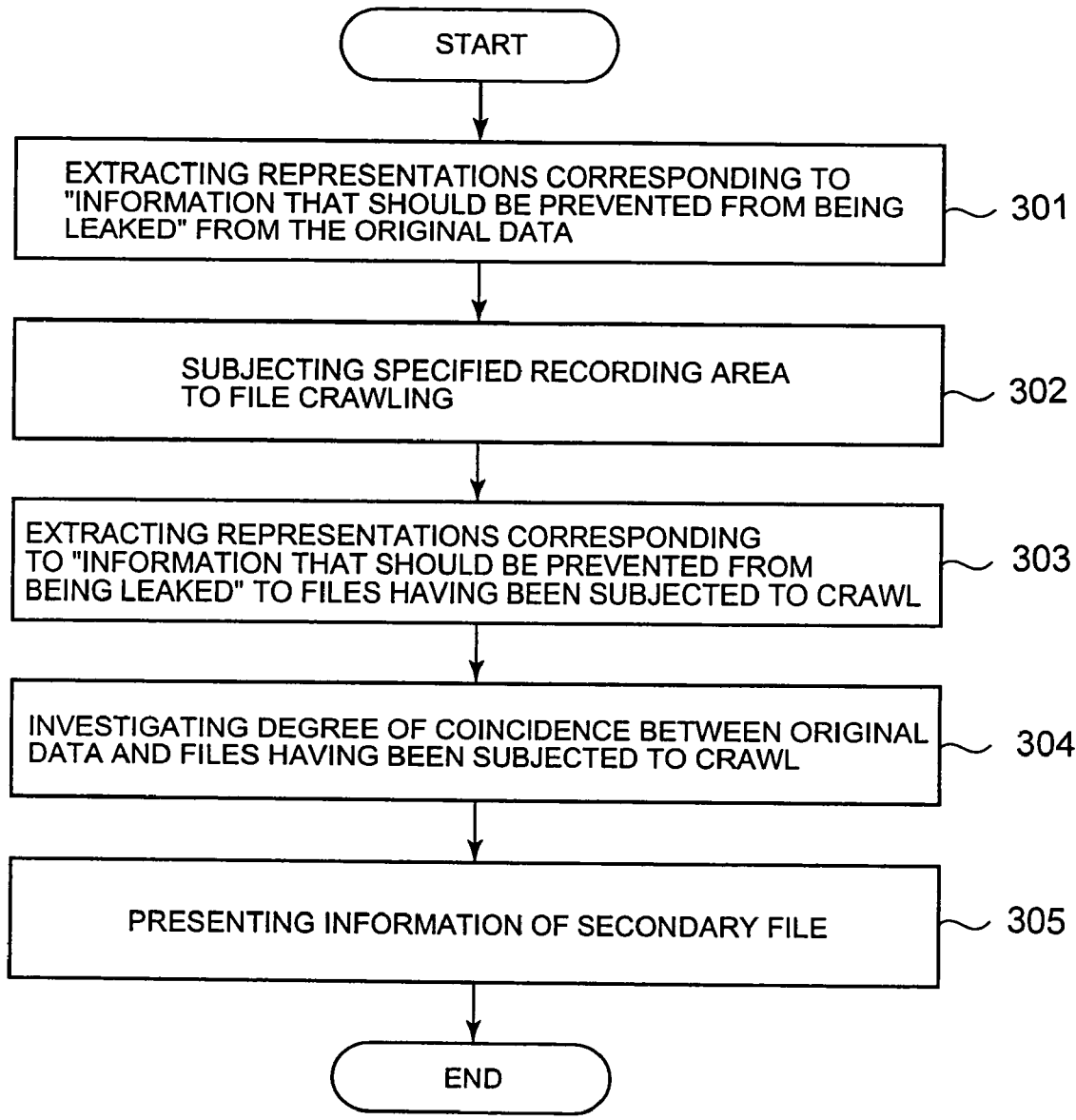
FIG. 2 is a flow chart showing flow of a main operation of the leaked information presenting apparatus 10.

FIG. 2 is a flow chart showing a flow of a main operation of the leaked information presenting apparatus 10. First, the extracting section 110 extracts the representations corresponding to the "information that should be prevented from being leaked" for the original data (Step 301). Next, the extracting section 110 executes a crawling of a file against the specific recording area specified by the user (Step 302). The crawling of the file herein is extracting only a predetermined file from the data recorded in a predetermined range. In other words, the extracting section 110 extracts the file in which the "information that should be prevented from being leaked" may be described, among the files recorded on the recording areas 170a and 170b. Here, extracting only a file convertible to the text format by the filter 120 may result in extracting the file in which the "information that should be prevented from being leaked" may be described by the extracting section 110.

Next, in a manner similar to that of respective files to which the crawl has been performed, the representations corresponding to the "information that should be prevented from being leaked" are extracted (Step 303). Next, the investigating section 140 investigates the degree of coincidence between the representation extracted from the original data and the representation extracted from the file retrieved by crawling (Step 304). Based on the investigation result, the presenting section 150 will present information regarding the file secondly created from the original data (Step 305). Consequently, the user is able to obtain the information regarding the file secondly created from the original data. Specifically, when the user thinks that the file is recorded in the recording areas 170a and 170b, but cannot actually specify which file is the secondary file, employing the leaked information presenting apparatus 10 will allow the information regarding the secondary file to be obtained.

Figure 3:
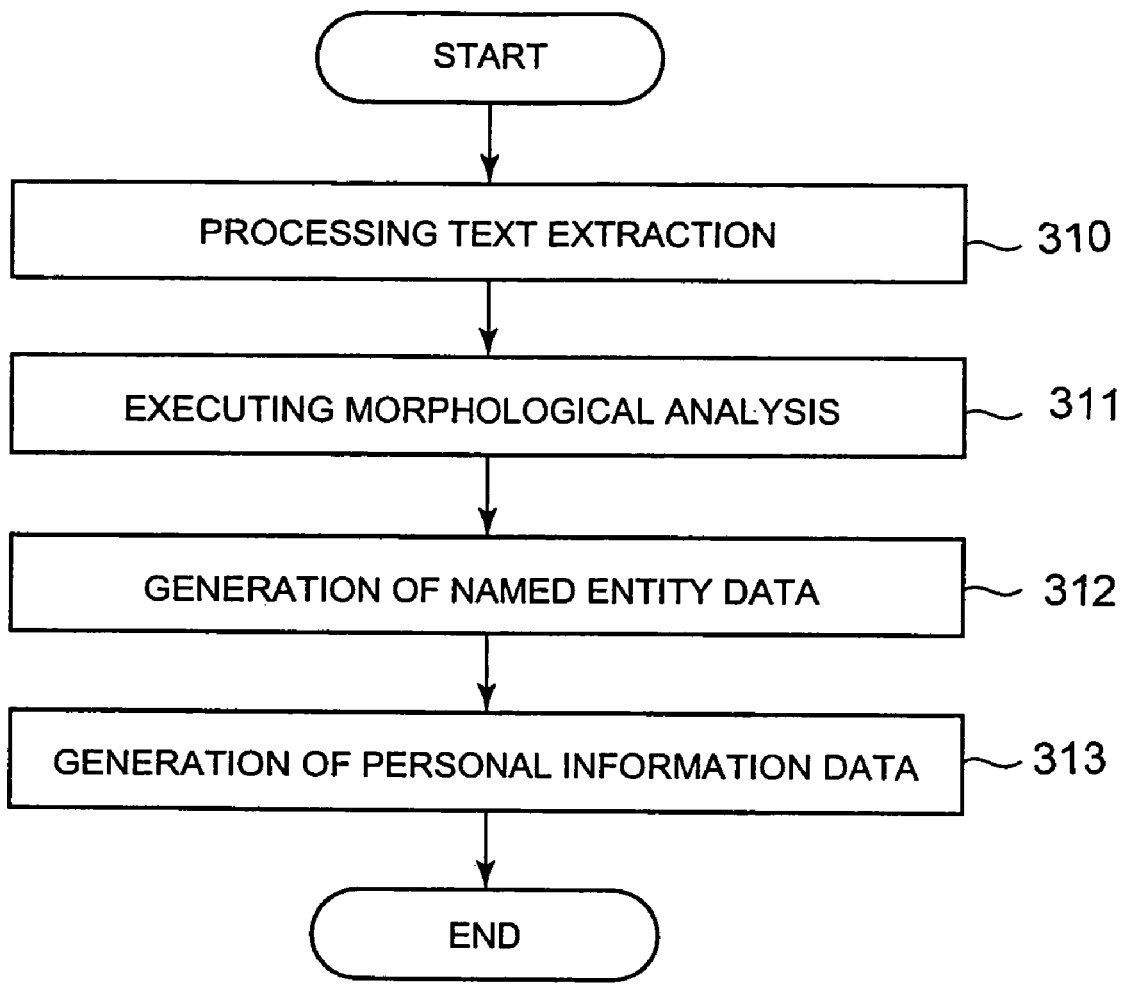
FIG. 3 is a flow chart showing a flow of operation of an extracting section 110.

FIG. 3 is a flow chart showing a flow for the extracting section 110 to extract the representations corresponding to the "information that should be prevented from being leaked" to a predetermined file.

First, the filter 120 converts the original data to the text format data (Step 310). Next, the analysis section 130 executes the morphological analysis to the file converted to the text format file (Step 311). In other words, the analysis section 130 provides each of the characters of the text format file with a word class, as shown in Table 1, and classifies the words and the characters. Next, based on the result of the executed morphological analysis, the extracting section 110 extracts the named entities and creates the named entity data (Step 312).

As an example, an example in which the representation extracting section 132 generates the frame for the named entity is shown in Table 3.

TABLE 3

| Family name | Given name | Zip code | Address | Telephone Number | Organization | e-mail address |
|---|---|---|---|---|---|---|
| Tanaka | Kenichi | | | | Development division | tan@ibm.xxx |
| Suzuki | | | Okinawa Pref. | | | |
| | Hanako | 123-xxxx | | | | tt@abc.xxx |
| | | xxx-xxxx | | xx-xxx-xx | | |
| Sato | Ichiro | | Toshimaku | | | |
| Kimura | Gen | | | xx-xxx-xx | | |
| Yamada | | | | | | yama@abc.xx |

Next, the representation extracting section 132 extracts the "information that should be prevented from being leaked" from the named entity data (Step 313). The representation extracting section 132 generates the personal information data based on the frame recognized as the "information that should be prevented from being leaked."

From the example of the foregoing table 3, the personal information data detected as the "information that should be prevented from being leaked" are shown in Table 4. In this example, a determining condition for extracting the "information that should be prevented from being leaked" from the named entity data (representation data with high possibility of being the information that should be prevented from being leaked) is in the case where the family name and the given name exist as values, and a value has been supplied to any one of the address, the telephone number, and the e-mail address.

| Family name | Given name | Zip code | Address | Telephone number | Organization | e-mail address |
|---|---|---|---|---|---|---|
| Tanaka | Kenichi | | | | Development division | tan@ibm.xxx |
| Sato | Ichiro | | Toshimaku x-x-x | | | |
| Kimura | Gen | | | xx-xxx-xx | | |

As described above, the extracting section 110 extracts the personal information data which are the representations corresponding to the "information that should be prevented from being leaked" from the predetermined file. The extracting section 110 extracts the personal information data from both of the original data and the file subjected to the crawling. The investigating section 140 executes comparison of respective personal information data which have been extracted to make investigation of the degree of coincidence. Based on the investigation result, the presenting section 150 presents the information regarding the secondary file.

FIG. 4 is an example of the information regarding the secondary file. The presenting section 150 provides the information (file name, recorded location of the file, and relationship of the "information that should be prevented from being leaked" between the file and the original data) regarding the secondary file. In this example, the recording areas 170a and 170b to be a search target of the "information that should be prevented from being leaked" are "C:\My Documents", and a file of "address.doc" listed here is a file with a high possibility of being secondarily created from the leaked original data. An entry of the "personal information" represents the number of personal information data specified as the personal information in this file, and an entry of "personal information [the number of elements]" represents the number of values in the personal information data of the personal information data specified as the personal information in this file. A person's name (diff) and an address (diff) represent the total different numbers of person's names and addresses described in the original data. The number of coincidences represents the number of personal information data (personal information data determined to be the personal information) coincident between the original data and this file.

According to the number of coincidences of the personal information, the user may determine that the file of "address.doc" is the file secondarily created from a primary file. Moreover, since a file of "Manager_address.txt" has the higher number of coincidences of the personal information next to the file of "address.doc", it may be determined that this file has high possibility to be a tertiary file.

Figure 5:
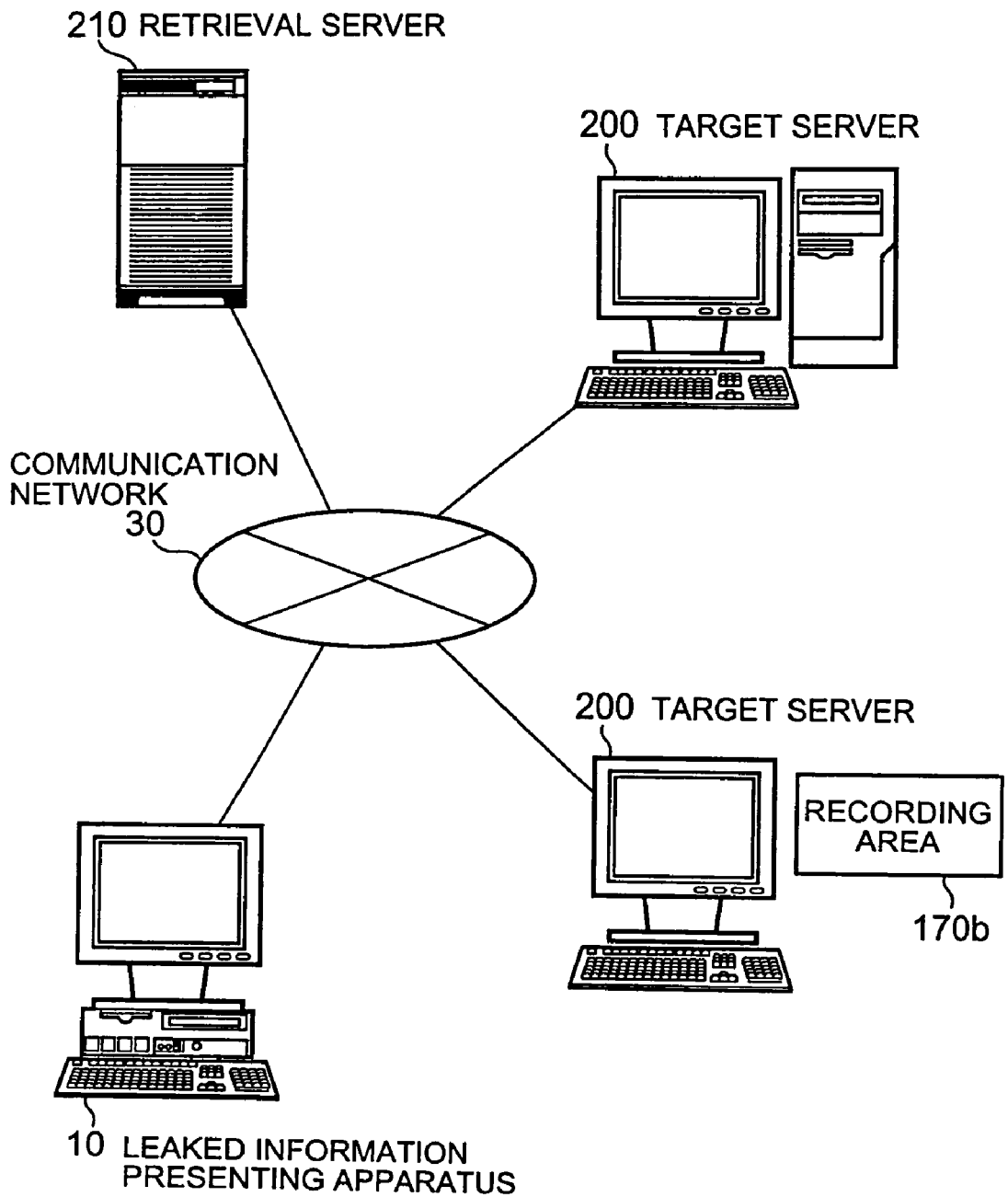
FIG. 5 is a network diagram showing a configuration of a system including a retrieval server 210 in the leaked information presenting apparatus 10.

With reference to FIG. 5, a description of a case where the leaked information presenting apparatus 10 is connected to a communication network 30, and the recording areas 170a and 170b are present in a target server 200 connected to the communication network 30 will be provided. The target server 200 is a general computer. When a file in which the "information that should be prevented from being leaked" is described is recorded on the recording areas 170a and 170b of the target server 200, the extracting section 110 of the leaked information presenting apparatus 10 executes the crawling via the communication network 30 to extract the representations (personal information data) corresponding to the "information that should be prevented from being leaked".

Next, with reference to FIG. 5, there will be provided a description of a method by which the leaked information presenting apparatus 10 detects the "information that should be prevented from being leaked" when the "information that should be prevented from being leaked" is recorded in the computer connected to the communication network 30, and when the user cannot specify the recording areas 170a and 170b. As will be understood, in the foregoing description, there has been described the method of detecting the "information that should be prevented from being leaked" in the recording areas 170a and 170b when the user grasps the location (a path name and a folder name in which the file is assumed to be stored) of the recording areas 170a and 170b, and can specify the recording area. A method of detecting the "information that should be prevented from being leaked" will be hereinbelow described when the location of the recording areas 170a and 170b is unknown.

When the leaked information presenting apparatus 10 is connected to the communication network 30, and the file in which the "information that should be prevented from being leaked" is described is recorded on the target server 200, the leaked information presenting apparatus 10 presents the information on the file (refer to FIG. 5). The leaked information presenting apparatus 10, a retrieval server 210, and the target server 200 are connected to the communication network 30, respectively, and these computers can mutually communicate with one another. The communication network 30 may be either of the Internet and a LAN, and may be a network composed of their combinations. The retrieval server 210 herein is a server for presenting link information to the files that are recorded on the computers (target server 200 or the like) accessible on the communication network 30, in response to the information input from the user.

The leaked information presenting apparatus 10 may further include a communicating section that is connected to the communication network 30 for communication, a search requesting section for requesting execution of retrieval of the "information that should be prevented from being leaked" of the retrieval server 210, and an acquiring section for acquiring a retrieved result.

Figure 6:
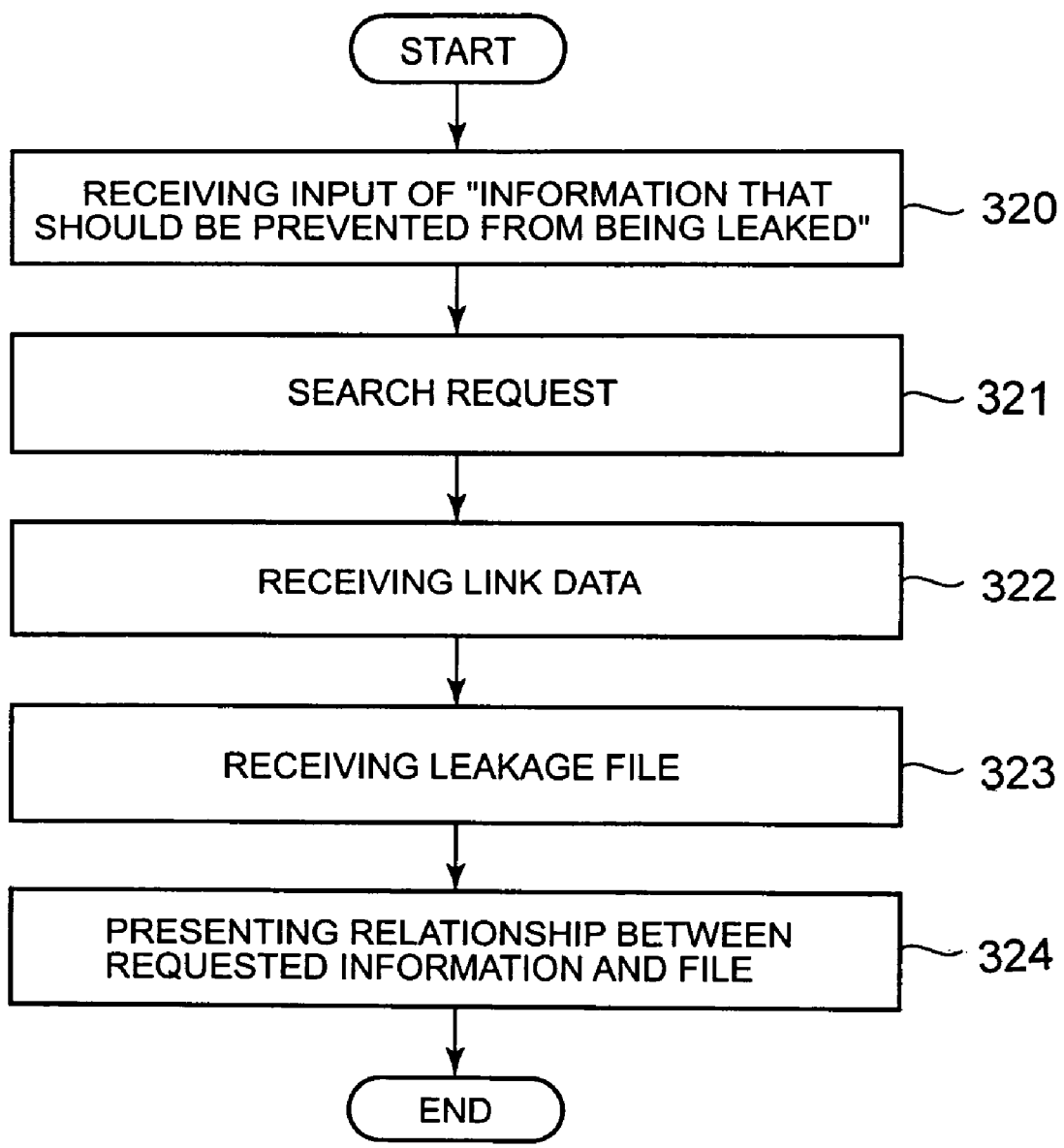
FIG. 6 is a flow chart showing a flow of a main operation of the leaked information presenting apparatus 10 when recording areas 170a and 170b cannot be specified.

Respective sections for composing the leaked information presenting apparatus 10 will be described with reference to the flow chart of FIG. 6. The leaked information presenting apparatus 10 receives the input of the "information that should be prevented from being leaked" from the user (Step 320). The input of the "information that should be prevented from being leaked" may receive the input, as a keyword, of only information related to individuals, such as full name and address, or may receive the input of a file in which the "information that should be prevented from being leaked" is listed. Next, the search requesting section requests the retrieval server 210 to search for the "information that should be prevented from being leaked" via the communication network 30 (Step 321). The retrieval server 210 searches for a file in which the specified "information that should be prevented from being leaked" is described across the target servers 200 connected to the communication network 30. The retrieval server 210 creates link data including a link to the retrieved file (file that indicates the address location to this file) using the searched result. The acquiring section receives the link data (Step 322).

Next, by accessing a link destination (target server 200) of the link data acquired by the acquiring section, the presenting section 150 receives the file in which the "information that should be prevented from being leaked" is described (Step 323). For example, for a file being on public view on the Internet, by accessing the target server 200 on which the file is recorded, the presenting section 150 acquires this file. The presenting section 150 acquires this file from all link destinations, and presents information on a relationship between these files and the "information that should be prevented from being leaked" that has been requested and retrieved in response to the input from the user (Step 324). For example, the presenting section 150 presents the number of data of the described "information that should be prevented from being leaked" coincident to the "information that should be prevented from being leaked" inputted by the user.

When the "information that should be prevented from being leaked" received from the user is a character string corresponding to one slot as a family name and given name, for example, "Tanaka Ichiro", the presenting section 150 presents an address location (URL or the like) of a file in which information on "Tanaka Ichiro" is described, and information, such as a location in the file in which this "Tanaka Ichiro" is described, the number of descriptions, or the like. The search requesting section may request the retrieval server 210 to retrieve the inputted "information that should be prevented from being leaked" in a file that is further linked from the file of the address location described in the link data.

When the "information that should be prevented from being leaked" received from the user is, for example, a file in which a plurality of full names, telephone numbers, or the like are described, and a file (secondary file) considered to be created based on this file (original data) is retrieved through the communication network 30, information for indicating a relationship with the original data may be presented in addition to presenting an address location (URL or the like) on which the secondary file is recorded. In other words, each of the sections of the filter 120, the analysis section 130, and the representation extracting section 132 performs each of processes to the original data, so that the leaked information presenting apparatus 10 generates the personal information data to be the "information that should be prevented from being leaked". Based on the personal information data, the acquiring section requests the search server 210 to search for the "information that should be prevented from being leaked".

The acquiring section receives the secondary file, after receiving the link data from the retrieval server 210. Each of the sections of the filter 120, the analysis section 130, the representation extracting section 132, and the representation extracting section 132 performs each of the processes to this secondary file. As a result, the representation extracting section 132 generates the personal information data to be the "information that should be prevented from being leaked" to the each of the secondary files. Subsequently, the investigating section 140 compares the personal information data of the original data with the personal information data of respective secondary files, and the presenting section 150 presents the information related to the secondary file or the tertiary file assumed to have been leaked from the original data. Specifically, the investigating section 140 counts the number of presences of the "information that should be prevented from being leaked" coincident with that among the personal information data of the original data and the personal information data acquired from the respective files. Based on the result, the presenting section 150 presents a file including personal information data with the largest number of coincidences to the user as a file with a high possibility of being created based on the original data.

FIG. 7 is a table showing an example in which the presenting section 150 presents the user with the information on the secondary file assumed to be generated based on a predetermined original data (address location (URL), the number of coincidences of the "information that should be prevented", or the like). Since a file recorded on an address of http://www.aaa.xxx/1/2/abc/data.html has the largest number of data of the "information that should be prevented from being leaked" coincident with the original data, it has a high possibility of being a file generated based on the original data. Moreover, even in the case of http://www.gro.xx/aa/bb/DATA.html, or http://www.bb.xx/qq/ss/data05.pdf, since one datum of the "information that should be prevented from being leaked" coincident therewith is described, it may be a file leaked and generated from the original data.

As will be obvious from the foregoing description, according to the information presentation apparatus, the method, and the program in accordance with the present invention, The file secondarily or tertiarily derived and created from the once leaked file is searched for based on the firstly leaked file, thereby making it possible to present the information on the derivative files. Additionally, it is possible to provide the apparatus capable of presenting the information on the "information that should be prevented from being leaked" that is recorded on the computer accessible via a wide area network, and searching for the file that is created based on the once leaked file and on public view within a wide area network, and the method and the program for use therein.

Figure 8:
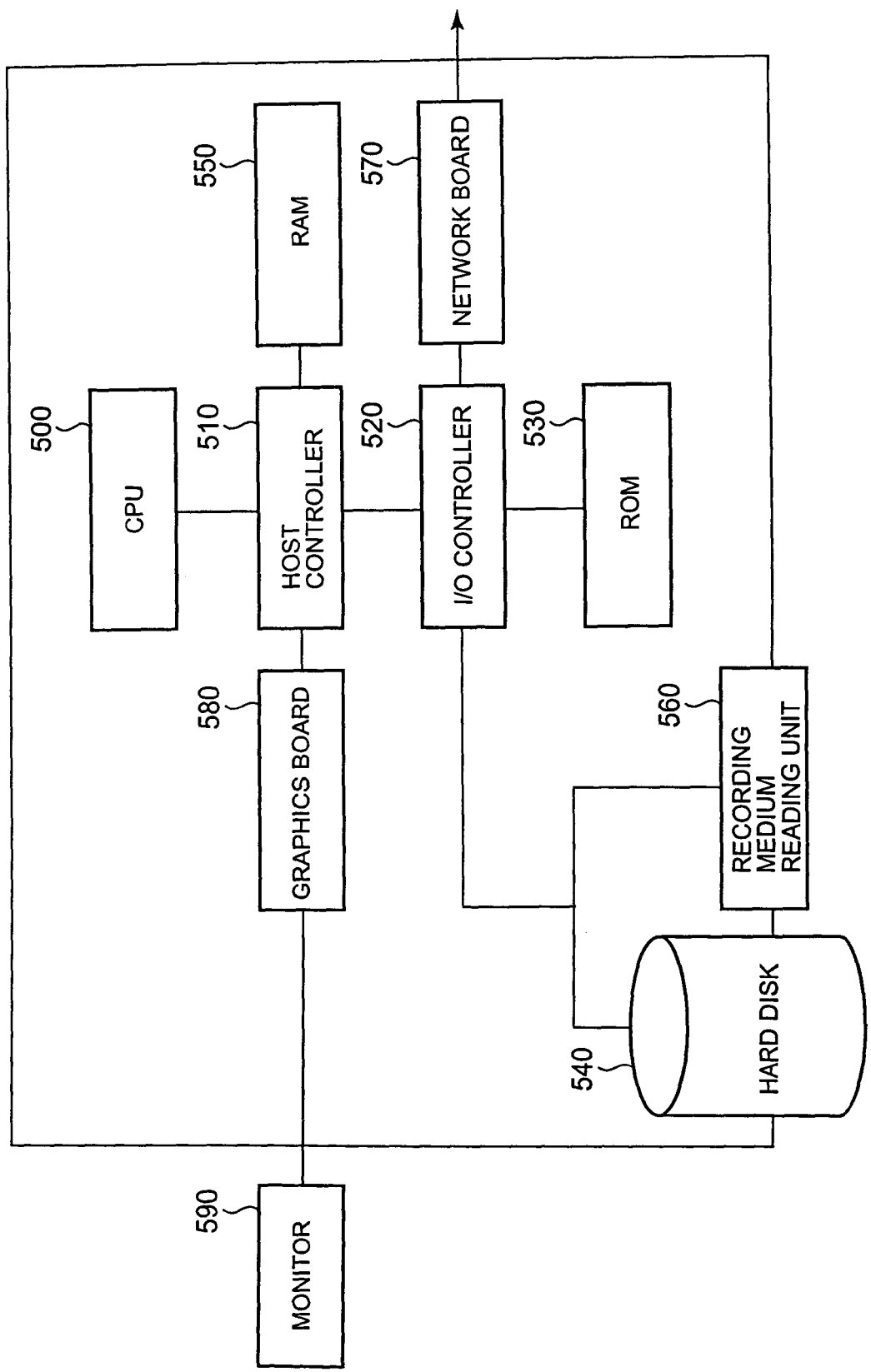
FIG. 8 is a schematic block diagram showing an example of a hardware configuration of the leaked information presenting apparatus 10.

FIG. 8 is a schematic diagram showing an example of a hardware configuration of the leaked information presenting apparatus 10. A CPU 500 reads the program for achieving a leaked information presentation method via a host controller 510 and an I/O controller 520 from a hard disk 540 or a recording medium reading unit 560, or ROM 530, and records the read program on a RAM 550 to execute the program. By executing the respective steps constituting the program, the CPU 500 may serve as the extracting section 110, the filter 120, the analysis section 130, the representation extracting section 132, the investigating section 140, and the presenting section 150. Moreover, when executing this program, the CPU 500 may read data recorded on the hard disk 540 or the recording medium reading unit 560. The CPU 500 displays a determination result or a calculation result of the information on a monitor 590 via a host controller 510. The CPU 500 acquires data from the retrieval server 210 or the target server 200 connected to the communication network via a network board 570 and the I/O controller 520. The CPU 500 may display the result on the monitor 590 via a graphics board 580.

The method of achieving such embodiment may be realized with a program executed in a computer or a server. A recording medium used for this program product includes an optical recording medium, a tape medium, a semiconductor memory, or the like. Moreover, a recording unit, such as a hard disk or a RAM provided in the server system that is connected to a private telecommunication network or the Internet may be used as the recording medium to thereby provide the program product via the network.

While the embodiments of the present invention have been described hereinbefore, these are provided to illustrate only several specific examples and accordingly, the present invention is not intended to be limited to these examples in particular. Moreover, while advantageous results described in the embodiments of the present invention only lists the most preferred advantages derived from the present invention, the advantageous results due to the present invention is not limited to those described in the foregoing embodiments of the present invention.

What is claimed is:

1. A computer-implemented method of tracking and reporting confidential information that should be prevented from being leaked by a computer device, comprising the steps of:
   recording original data of a leaked file from a computer;
   extracting anti-leakage data from the original data and a file existing in a recording area by the computer, including one or more combinations of data indicating a plurality of character strings corresponding to the confidential information that should be prevented from being leaked;
   storing parts of the extracted anti-leakage data in designated table positions;
   setting a separate lifetime value for each designated table position;
   clearing the table position from information at the expiration of the lifetime value;
   converting the extracted anti-leakage data from spreadsheet format and internet program data format to a text format;
   performing a morphological analysis on the extracted anti-leakage data and determining classes of words for the confidential information including recognizing a card account number, proper names, company names, and zip codes; and
   investigating a degree of association between a combination included in the anti-leakage data extracted from the file existing in the recording area and included in the anti-leakage data extracted from the original data in order to track and report confidential information that has leaked.

* * * * *